(12) United States Patent
Kamiya et al.

(10) Patent No.: US 10,606,891 B2
(45) Date of Patent: Mar. 31, 2020

(54) JSON DATA VALIDATION

(71) Applicant: FUJITSU LIMITED, Kawasaki-shi, Kanagawa (JP)

(72) Inventors: Takuki Kamiya, San Jose, CA (US); Wei-Peng Chen, Fremont, CA (US); Mehdi Bahrami, Santa Clara, CA (US)

(73) Assignee: FUJITSU LIMITED, Kawasaki (JP)

( * ) Notice: Subject to any disclaimer, the term of this patent is extended or adjusted under 35 U.S.C. 154(b) by 327 days.

(21) Appl. No.: 15/445,793

(22) Filed: Feb. 28, 2017

(65) Prior Publication Data
US 2018/0246984 A1 Aug. 30, 2018

(51) Int. Cl.
G06F 16/00 (2019.01)
G06F 16/84 (2019.01)

(52) U.S. Cl.
CPC .................... G06F 16/84 (2019.01)

(58) Field of Classification Search
CPC ...... G06F 16/84; G06F 16/254; G06F 16/258; G16H 10/60
See application file for complete search history.

(56) References Cited

U.S. PATENT DOCUMENTS

| 9,235,652 | B1* | 1/2016 | Jeffery | G06F 16/254 |
| 2006/0206503 | A1* | 9/2006 | Gaurav | G06F 17/2247 |
| 2012/0158823 | A1* | 6/2012 | Ahuja | G06F 9/54 |
| | | | | 709/203 |
| 2013/0204886 | A1* | 8/2013 | Faith | G06Q 30/0643 |
| | | | | 707/756 |
| 2013/0226944 | A1* | 8/2013 | Baid | G06F 16/88 |
| | | | | 707/756 |
| 2013/0290234 | A1* | 10/2013 | Harris | G06N 5/022 |
| | | | | 706/46 |
| 2014/0026029 | A1* | 1/2014 | Kamiya | G06F 17/2205 |
| | | | | 715/234 |
| 2014/0067866 | A1* | 3/2014 | Chen | H04L 69/06 |
| | | | | 707/791 |
| 2014/0122996 | A1* | 5/2014 | Gupta | G06F 8/38 |
| | | | | 715/234 |
| 2015/0026189 | A1* | 1/2015 | Li | G06F 16/2228 |
| | | | | 707/741 |
| 2015/0244511 | A1* | 8/2015 | Elias | H04L 67/16 |
| | | | | 709/204 |
| 2016/0094421 | A1* | 3/2016 | Bali | H04L 43/04 |
| | | | | 709/223 |
| 2016/0117410 | A1* | 4/2016 | Kamiya | G06F 16/9024 |
| | | | | 715/242 |
| 2016/0162478 | A1* | 6/2016 | Blassin | G06Q 10/06311 |

(Continued)

OTHER PUBLICATIONS

Schneider et al., W3C , Efficient XML Interchange (EXI) Format 1.0 (Second Edition), 93 pages (Year: 2014).*

(Continued)

Primary Examiner — Noosha Arjomandi
(74) Attorney, Agent, or Firm — Maschoff Brennan

(57) ABSTRACT

A JavaScript Object Notation (JSON) data validation method may include generating a description schema for defining JSON data using one or more JSON constructs. The method may further include converting the description schema to an Extensible Markup Language (XML) schema. The method may also include converting the JSON data to XML data, and validating the JSON data based on the XML Schema and the XML data.

20 Claims, 13 Drawing Sheets

(56) References Cited

U.S. PATENT DOCUMENTS

2016/0314099 A1* 10/2016 Lin ...................... G06F 17/211
2017/0315970 A1* 11/2017 Kamiya ................ G06F 17/227
2018/0075049 A1* 3/2018 Capillo Carril ....... G06F 16/211
2018/0218057 A1* 8/2018 Beckham ............. A01K 11/008

OTHER PUBLICATIONS

JSON-Schema. See http://json-schema.org/, accessed Feb. 28, 2017.
XML Schema, W3C, Oct. 28, 2004.
EXI4JSON specification, W3C, Aug. 23, 2016.
Pending U.S. Appl. No. 15/144,600, filed May 2, 2016.

* cited by examiner

XML Schema

406

```
<xsd:schema targetNamespace='http://www.w3.org/2015/EXI/json'
       xmlns:xsd='http://www.w3.org/2001/XMLSchema'
       elementFormDefault='qualified'>
  <xsd:element name='map'>
    <xsd:complexType>
      <xsd:sequence>
        <xsd:element name='firstName'>
          <xsd:complexType>
            <xsd:sequence>
              <xsd:element name='string'>
                <xsd:simpleType>
                  <xsd:restriction base='xsd:string'>
                  </xsd:restriction>
                </xsd:simpleType>
              </xsd:element>
            </xsd:sequence>
          </xsd:complexType>
        </xsd:element>
        <xsd:element name='lastName'>
          <xsd:complexType>
            <xsd:sequence>
              <xsd:element name='string'>
                <xsd:simpleType>
                  <xsd:restriction base='xsd:string'>
                  </xsd:restriction>
                </xsd:simpleType>
              </xsd:element>
            </xsd:sequence>
          </xsd:complexType>
        </xsd:element>
        <xsd:element name='country' minOccurs='0'>
          <xsd:complexType>
            <xsd:sequence>
              <xsd:element name='string'>
                <xsd:simpleType>
                  <xsd:restriction base='xsd:string'>
                  </xsd:restriction>
                </xsd:simpleType>
              </xsd:element>
            </xsd:sequence>
          </xsd:complexType>
        </xsd:element>
      </xsd:sequence>
    </xsd:complexType>
  </xsd:element>
</xsd:schema>
```

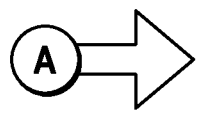

```
                                    ┌─650
 <xsd:element name='map'>
  <xsd:complexType>
```

FIG. 6B

```
                                    ┌─652
  <xsd:complexType>
 </xsd:element>
```

FIG. 6C

```
                                    ┌─654
<xsd:element name="string">
  <xsd:simpleType>
    <xsd:restriction base="xsd:string" />
  </xsd:simpleType>
</xsd:element>
```

FIG. 6D

```
                                    ┌─656
<xsd:element name="number">
  <xsd:simpleType>
    <xsd:restriction base="xsd:double" />
  </xsd:simpleType>
</xsd:element>
```

FIG. 6E

```
<xsd:element name="$name" minOccurs="0">
```
If the particle is optional, or
```
<xsd:element name="$name" >
```
If the particle is required,
where $name is the name of this Named Definition

FIG. 7B

```
<xsd:complexType>
  <xsd:sequence>
```

FIG. 7C

```
  </xsd:sequence>
</xsd:complexType>
</xsd:element>
```

FIG. 7D

```
<xsd:sequence minOccurs="0">
if the particle is optional, or
<xsd:sequence>
if the particle is required.
```

*FIG. 8B*

```
</xsd:sequence>
```

*FIG. 8C*

```
<xsd:choice minOccurs="0">
if the particle is optional, or
<xsd:choice>
if the particle is required.
```

*FIG. 8D*

```
</xsd:choice>
```

*FIG. 8E*

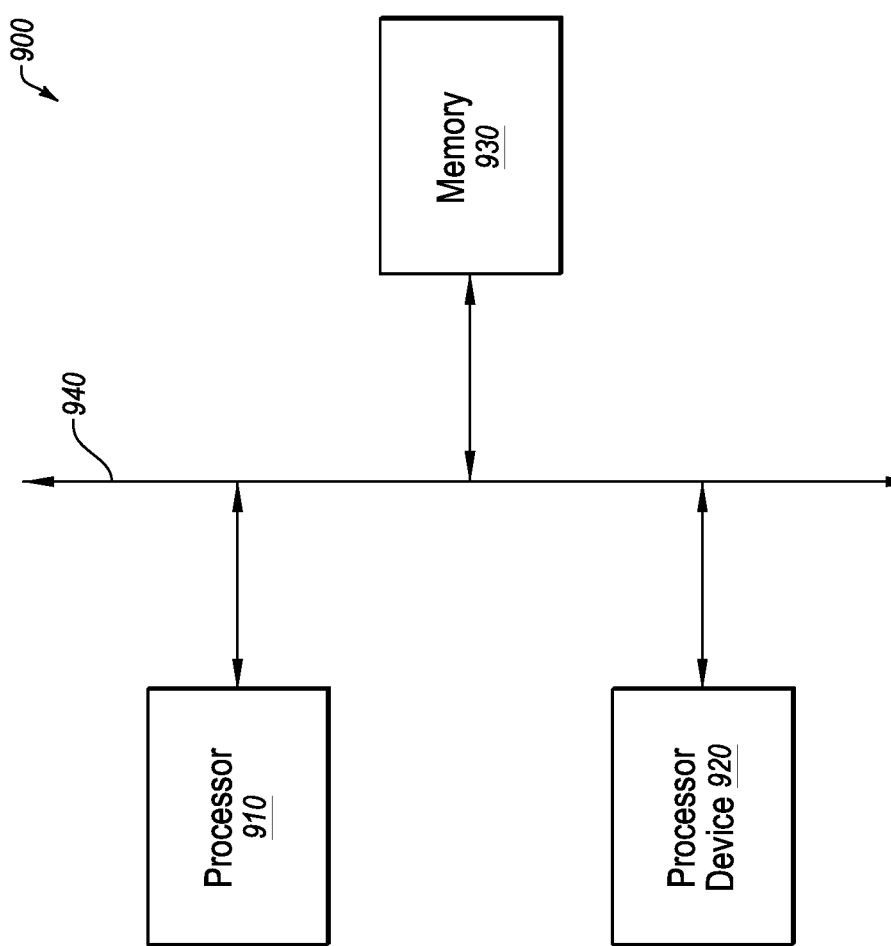

JSON DATA VALIDATION

FIELD

The embodiments discussed herein relate to JavaScript Object Notation (JSON) data validation.

BACKGROUND

Extensible Markup Language (XML) is a markup language that defines a set of rules for encoding documents in a plain-text format that is both human-readable and machine-readable. One version of XML is defined in the XML 1.0 Specification produced by the World Wide Web Consortium (W3C) and dated Nov. 26, 2008, which is incorporated herein by reference in its entirety. The XML 1.0 Specification defines an XML document as a text that is well-formed and valid.

An XML schema is a description of a type of XML document, typically expressed in terms of constraints on the structure and content of documents of that type, above and beyond the basic syntactical constraints imposed by the XML 1.0 Specification itself. These constraints are generally expressed using some combination of grammatical rules governing the order of elements, Boolean predicates associated with the content, data types governing the content of elements and attributes, and more specialized rules such as uniqueness, mandatory, and referential integrity constraints. The process of checking an XML document to determine if the XML document conforms to an XML schema is called validation, which is separate from XML's core concept of syntactic well-formedness. All XML documents are defined as being well-formed, but an XML document is on check for validity where the XML processor is "validating," in which case the XML document is checked for conformance with its associated schema.

Although the plain-text human-readable aspect of XML documents may be beneficial for different applications and purposes, this human-readable aspect may also lead to XML documents that are large in size and therefore incompatible with devices with limited memory or storage capacity. Efforts to reduce the size of XML documents have therefore often eliminated this plain-text human-readable aspect in favor of more compact binary representations.

JSON is a lightweight data interchange format for structuring data for transmission (e.g., between a server and a web application). JSON may be growing in popularity in part because it is considered to be easy to read and write for humans. JSON is a text format independent of any language but uses conventions that may be considered to be familiar with the languages descended from C, such as C, C++, C#, Java, JavaScript, Perl, Python, and others. JSON may be considered a data exchange language in part because of the overlap of conventions with languages descended from C.

The subject matter claimed herein is not limited to embodiments that solve any disadvantages or that operate only in environments such as those described above. Rather, this background is only provided to illustrate one example technology area where some embodiments described herein may be practiced.

SUMMARY

According to an aspect of an embodiment, a JSON data validation method may include generating a description schema for defining JSON data using one or more JSON constructs. The method may further include converting the description schema to an XML schema. The method may also include converting the JSON data to XML data, and validating the JSON data based on the XML Schema and the XML data.

The object and advantages of the embodiments will be realized and achieved at least by the elements, features, and combinations particularly pointed out in the claims.

It is to be understood that both the foregoing general description and the following detailed description are exemplary and explanatory and are not restrictive of the invention, as claimed.

BRIEF DESCRIPTION OF THE DRAWINGS

Example embodiments will be described and explained with additional specificity and detail through the use of the accompanying drawings in which:

FIGS. 4A and 4B illustrate an example description schema, a Javascript Object Model (JSOM), and an XML schema;

FIG. 6B depicts an example XML schema preamble for an object definition;

FIG. 6C depicts an example XML schema postamble for an object definition;

FIG. 6D depicts example XML schema for defining a string definition;

FIG. 6E depicts example XML schema for defining a number definition;

FIG. 7B depicts example XML schema preamble for defining a named definition;

FIG. 7C depicts example XML schema for defining a complex type;

FIG. 7D example XML schema including a plurality of end tags;

FIG. 8B depicts example XML schema preamble for defining whether or not a particle is optional;

FIG. 8C depicts example XML schema postamble including an end tag;

FIG. 8D depicts example XML schema defining whether or not a particle is optional;

FIG. 8E depicts example XML schema including an end tag; and

FIG. 9 is a block diagram of an example validation system.

DESCRIPTION OF EMBODIMENTS

The embodiments discussed herein are related to validating JSON data. More specifically, various embodiments relate to a schema for validating JSON data (e.g., the structure of JSON data) in an efficient manner. In some embodiments, JSON data (e.g., a JSON file) may be converted to XML data (e.g., an XML file). Further, in various embodiments, a description schema (also referred to herein as a "JSchema") representing the JSON data may be generated. Further, the JSchema, which may be used to define JSON data using JSON constructs, may be used to generate XML schema. Stated another way, the JSchema may define JSON data structures and/or datatypes, and may be used to generate an XML schema. The XML schema may be used to validate the JSON data. Various embodiments disclosed herein may reduce a memory footprint of a system (e.g., a memory-constraint systems, such as microcontrollers) configured for XML and/or JSON validation.

Embodiments of the present disclosure will be explained with reference to the accompanying drawings.

Figure 1:
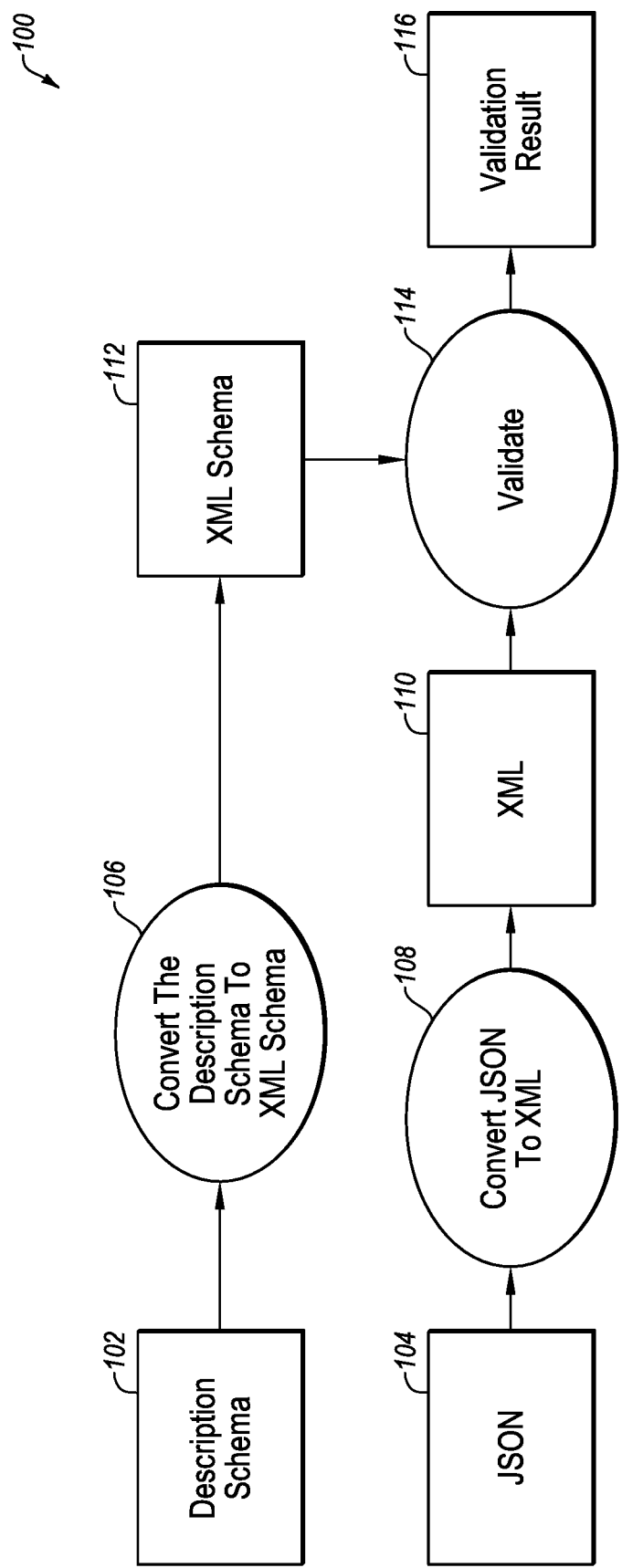
FIG. 1 is a diagram of an example flow that may be used to validate JSON data.

FIG. 1 shows an example flow 100 that may be used to validate JSON data, arranged in accordance with at least one embodiment described herein. In some embodiments, flow 100 may be configured to illustrate a process to validate JSON data. In these and other embodiments, a portion of the flow 100 may be an example of an operation of a validation system 900, as described below with reference to FIG. 9.

Flow 100 may begin at block 102. At block 102, a description schema 102 may be generated. As noted above, "description schema" may also be referred to herein as a "JSchema." For example, JSchema 102 may describe/represent JSON 104. For example, JSON 104 may include JSON data, such as one or more JSON files, and JSchema 102 may define one or more data structures and/or one or more datatypes for JSON 104.

At block 106, JSchema 102 may be converted to an XML schema 112. According to some embodiments, JSchema 102 may be loaded into a JSOM, which may be converted to XML schema 112. In some embodiments, JSchema 102 may be converted to XML schema 112 according to one or more of methods 500, 600, 700, and 800, as described with reference to FIGS. 5A-8E.

At block 108, JSON 104 may be converted to XML 110. JSON to XML conversion is known in the art, and any suitable process and/or device for converting JSON to XML may be used at block 108.

At block 114, JSON 104 may be validated based on XML 110 and XML schema 112 to generate a validation result 116. For example, one or more XML schema processors may receive XML 110 and XML Schema 112 to determine whether JSON 104 is valid or invalid.

Modifications, additions, or omissions may be made to the flow 100 without departing from the scope of the present disclosure. For example, the operations of flow 100 may be implemented in differing order. Furthermore, the outlined operations and actions are only provided as examples, and some of the operations and actions may be optional, combined into fewer operations and actions, or expanded into additional operations and actions without detracting from the essence of the disclosed embodiments. In short, flow 100 is merely one example of data flow for validating JSON data and the present disclosure is not limited to such.

Figure 2:
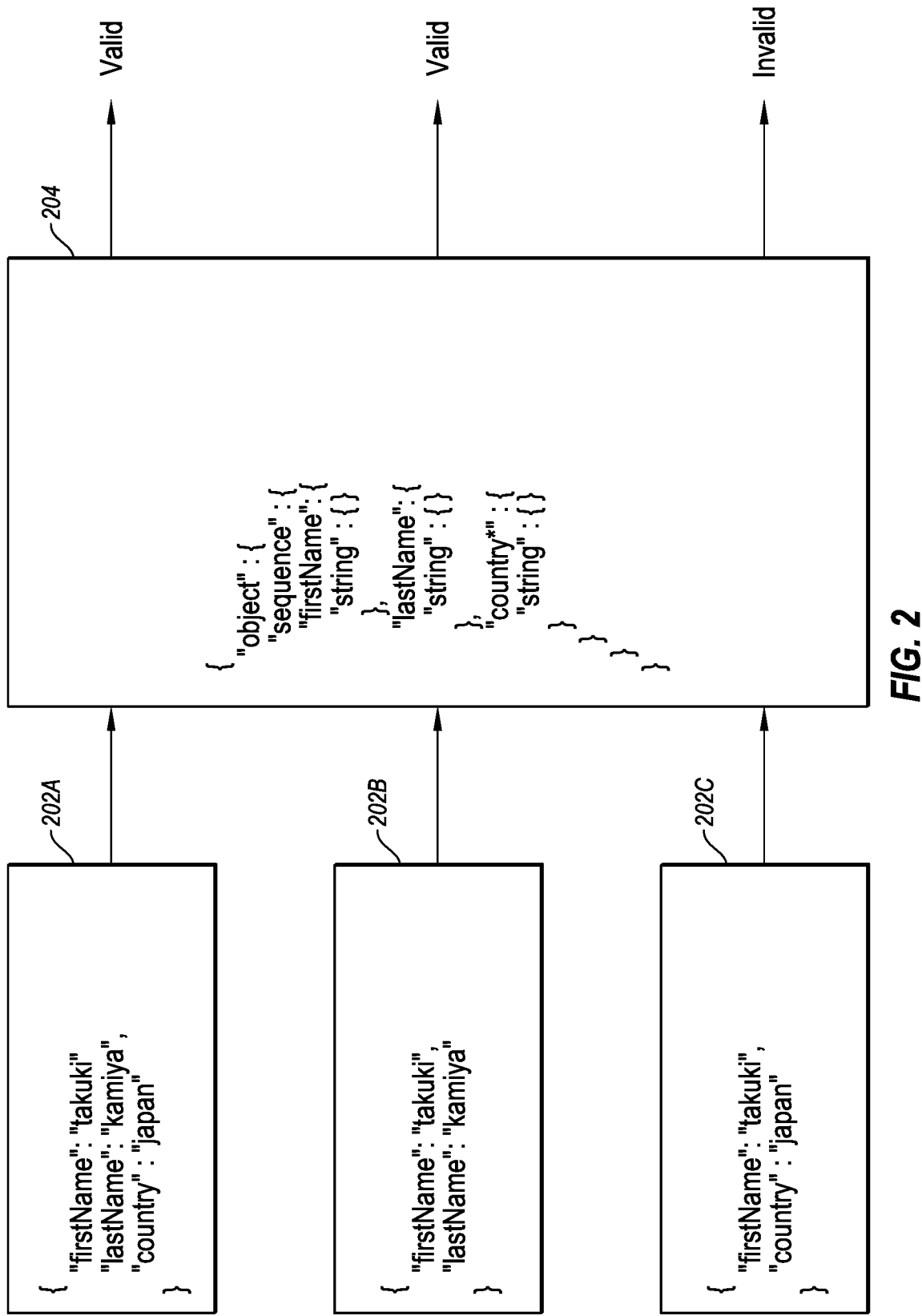
FIG. 2 illustrates example input JSON files and an example description schema.

FIG. 2A illustrates an example JSON data (e.g., JSON files 202A-202C) and an example JSchema 204. JSchema 204 includes an "object," which includes a "sequence." The sequence of JSchema 204 includes three properties, "firstName", "lastName", and "country", wherein each property is a string. Further, the "country" property is an optional property, and the "firstName" and "lastName" properties are required properties.

JSON file 202A defines the "firstName", "lastName", and "country" properties and, therefore, JSON file 202A is valid according to JSchema 204. JSON file 202B defines the "firstName" and "lastName" properties and, therefore, JSON file 202B is valid according to JSchema 204. JSON file 202C defines the "firstName" and "country" properties, but does not define the required "lastName" property and, therefore, JSON file 202C is invalid according to JSchema 204.

Figure 3A:
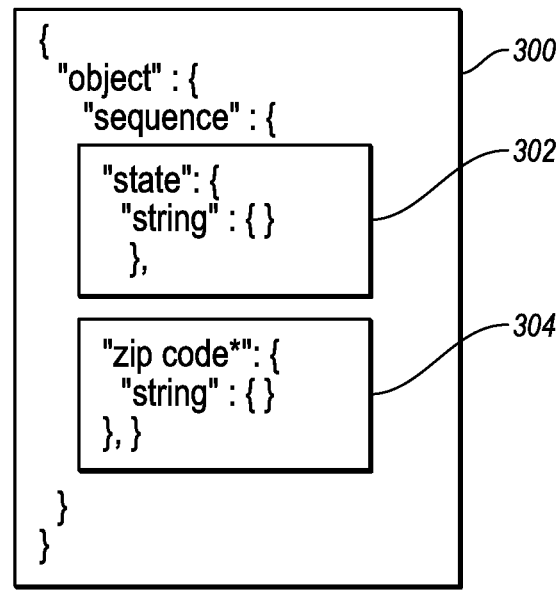
FIG. 3A depicts an example description schema.

FIG. 3A depicts an example JSchema 300. JSchema 300 includes an "object", which includes a "sequence" having two properties, "state", and "zip code." The state property and the zip code property are strings. Further, the "zip code" property of JSchema 300 is an optional property, and the "state" property of JSchema 300 is a required property.

Each JSchema may include an object definition (e.g., "object" of JSchema 300 is an object definition). Further, each object definition may include either a sequence definition or a choice definition (e.g., "sequence" of JSchema 300 is a sequence definition). Moreover, each sequence definition or choice definition of a JSchema may include no particles, one particle, or a plurality of particles. (e.g., JSchema 300 includes particles 302 and 304). Each particle may include a Boolean property (e.g., an "IsOptional" property) to depict an optional property (e.g., "zip code" of JSchema 300 is an optional property (e.g., as indicated by *)). Each particle may be either a named definition, a sequence definition or a choice definition. Each named definition of a JSchema may include a name (e.g., a JSON tuple name) and a definition. For example, "state" of particle 302 is a name, and "string" of particle 302 is a definition. Further, "zip code" of particle 304 is a name, and "string" of particle of 304 is a definition.

Figure 3B:
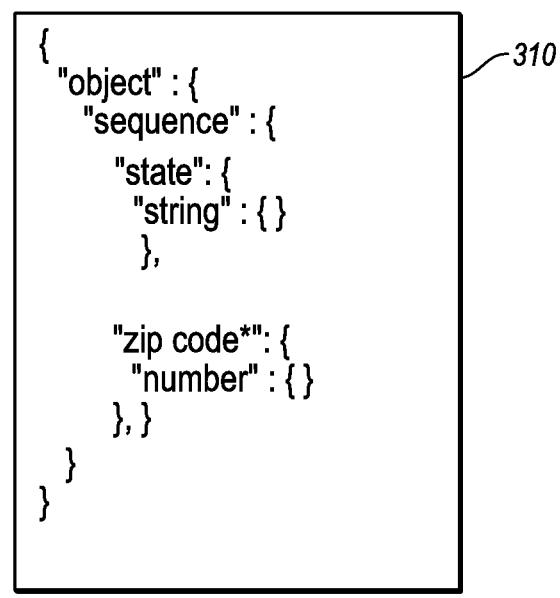
FIG. 3B depicts another example description schema.

FIG. 3B depicts an example JSchema 310. JSchema 310 includes an "object", which includes a "sequence" having two properties, "state", and "zip code." The "state" property of JSchema 310 is a string and the "zip code" property of JSchema 310 is a number. Each of the "state" property and the "zip code" property is a required property (e.g., due to the lack of an optional property indicator (e.g., "*")).

A definition may include either an object definition, a string definition, or a number definition. For example, as depicted in JSchema 310 of FIG. 3B, the "state" property includes a string definition and the "zip code" property includes a number definition.

Figure 4A:
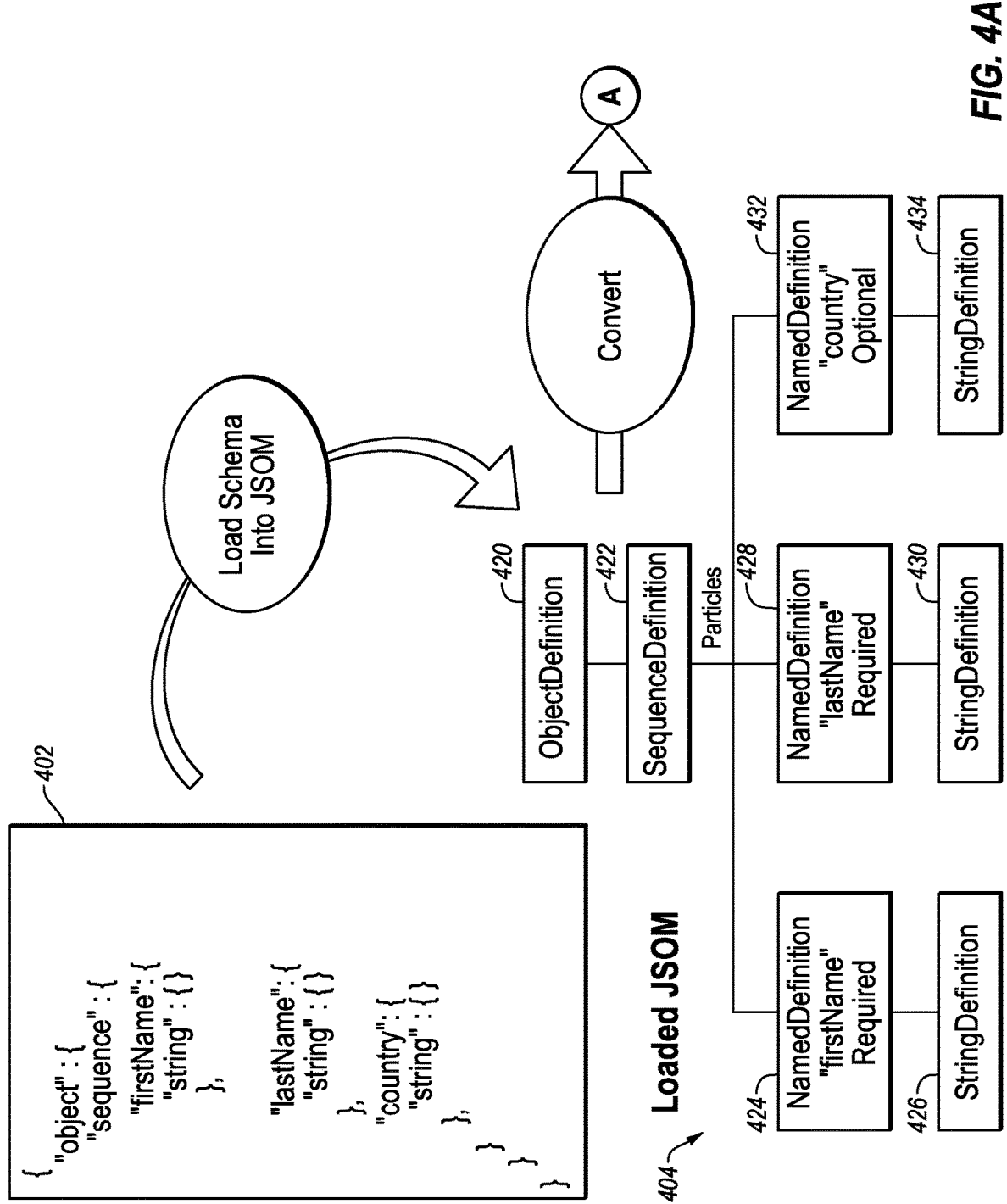

According to various embodiments, a JSchema may be loaded into a JSOM, the JSOM may be converted to XML schema, and a JSON may be validated via the XML schema. For example, FIGS. 4A and 4B depict an example JSchema 402, an example JSOM 404, and an example XML schema 406. JSchema 402 includes an object, which includes a sequence. The sequence of JSchema 402 includes three properties, "firstName", "lastName", and "country", wherein each property is a string. The "country" property is an optional property, and the "firstName" and "lastName" properties are required properties.

JSchema 402 may be loaded into a JSOM to generate JSOM 404. JSOM 404 includes an object definition 420 and a sequence definition 422. JSOM 404 further includes a NamedDefinition 424, which defines the "firstName" property, a NamedDefinition 428, which defines the "lastName" property, and a NamedDefinition 432, which defines the "country" property. JSOM 404 also includes StringDefinition 426, StringDefinition 430, and StringDefinition 434.

Further, as described in more detail below with reference to FIGS. 5A-8E, a JSOM may be converted to XML Schema, which may also be referred to as "XSD." In the example illustrated in FIGS. 4A and 4B, JSOM 404 is converted to XML Schema 406.

Figures 5A, 5B, 5C:
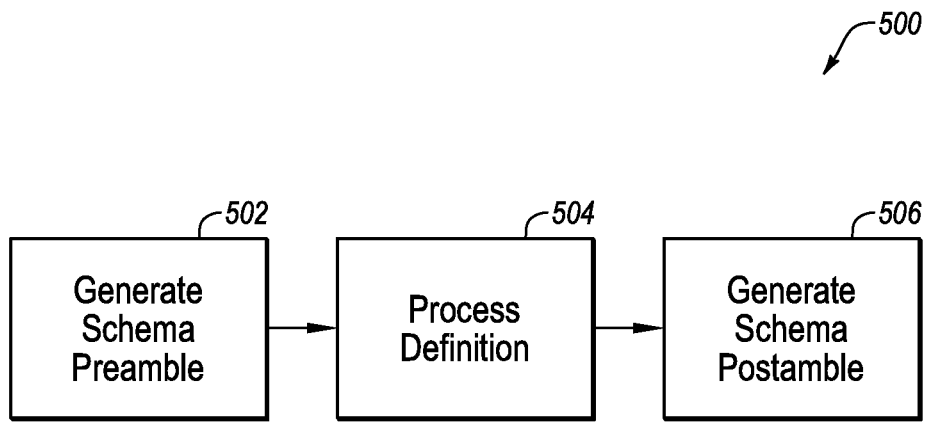
FIG. 5A is a block diagram of an example method of converting JSON data to an XML schema.
FIG. 5B depicts an example XML schema preamble.
FIG. 5C depicts an example XML schema postamble.

FIG. 5A shows an example flow diagram of a method 500 of converting JSchema data to an XML Schema, arranged in accordance with at least one embodiment described herein. In some examples, method 500 may be performed for each definition in the JSON data. Although illustrated as discrete blocks, various blocks may be divided into additional blocks, combined into fewer blocks, or eliminated, depending on the desired implementation.

In some embodiments, method 500 may be performed by a system such as validation system 900 of FIG. 9. For instance, processing device 920 of FIG. 9 may be configured to execute computer instructions stored on memory 930 to perform functions and operations as represented by one or more of the blocks of method 500.

Method 500 may begin at block 502. At block 502, an XML schema preamble for the JSchema data may be generated, and method 500 may proceed to block 504. In some embodiments, the XML schema preamble may be generated based on an input (e.g., one or more definitions). For example, as illustrated in FIG. 5B, an XML schema preamble 510 may be generated.

At block 504, a definition may be processed, and method may proceed to block 506. In some embodiments, a definition may be processed according to a method 600 described below with reference to FIG. 6A. For example, a "process definition" function may be called and the function may receive an input including one or more definitions.

At block 506, an XML schema postamble for the JSON data may be generated. For example, as illustrated in FIG. 5C, an XML schema postamble 520 may be generated.

Figure 6A:
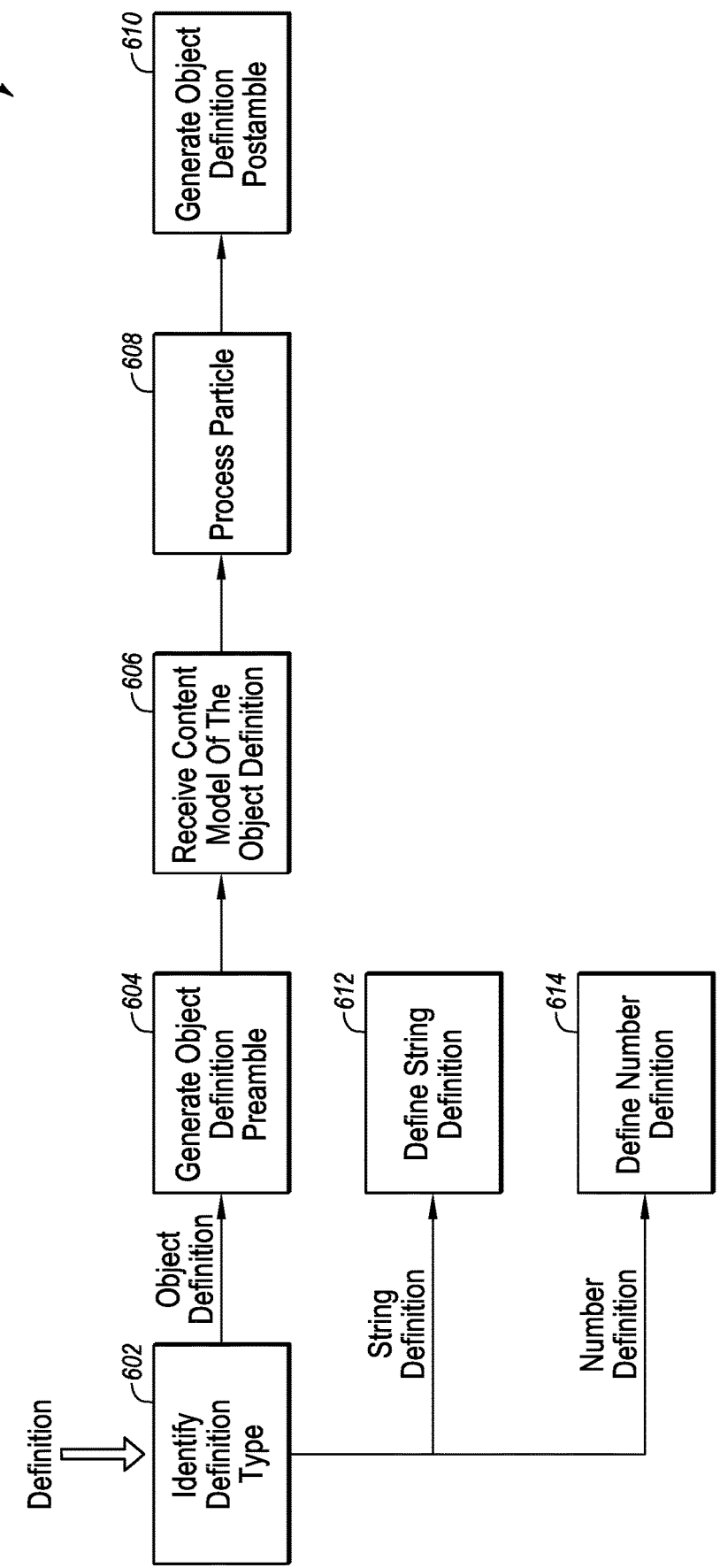
FIG. 6A is a block diagram of an example method of processing a definition of a description schema.

Modifications, additions, or omissions may be made to method 500 without departing from the scope of the present disclosure. For example, the operations of method 500 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment FIG. 6A shows an example flow diagram of a method 600 of processing a JSON data definition, arranged in accordance with at least one embodiment described herein. In some examples, method 600 may be performed for each definition in the JSON data. Although illustrated as discrete blocks, various blocks may be divided into additional blocks, combined into fewer blocks, or eliminated, depending on the desired implementation.

In some embodiments, method 600 may be performed by a system such as validation system 900 of FIG. 9. For instance, processing device 920 of FIG. 9 may be configured to execute computer instructions stored on memory 930 to perform functions and operations as represented by one or more of the blocks of method 600.

Method 600 may begin at block 602. At block 602, a definition type may be identified. For example, upon receipt of a definition as an input, a definition type may be identified as an object, a string, or a number. If the definition type is as an object definition, method 600 may proceed to block 604. If the definition type is a string definition, method 600 may proceed to block 612. If the definition type is a number definition, method 600 may proceed to block 614.

At block 604, an object definition preamble may be generated, and method 600 may proceed to block 606. In some embodiments, the object definition preamble may be generated based on the object definition. For example, an XML object definition preamble 650 is illustrated in FIG. 6B.

At block 606, a content model of the object definition may be received. For example, a content model of an object may be a sequence definition or a choice definition.

At block 608, a particle of the object may be processed, and method 600 may proceed to block 610. In some embodiments, the particle may be processed based on the content model. More specifically, a function for processing a particle may be called, and the function may receive the content model of the object (e.g., a sequence definition or a choice definition) as an input. In some embodiments, a particle may be processed according to method 700 described below with reference to FIG. 7A.

At block 610, an object definition postamble may be generated. For example, an object definition postamble 652 is illustrated in FIG. 6C.

At block 612, the string definition may be defined. For example, XML code defining the string definition may be generated. As a more specific example, XML schema 654 defining a string definition is illustrated in FIG. 6D.

At block 614, the number definition may be defined. For example, XML code defining the number definition may be generated. As a more specific example, XML schema 656 defining a number definition is illustrated in FIG. 6E.

Figure 7A:
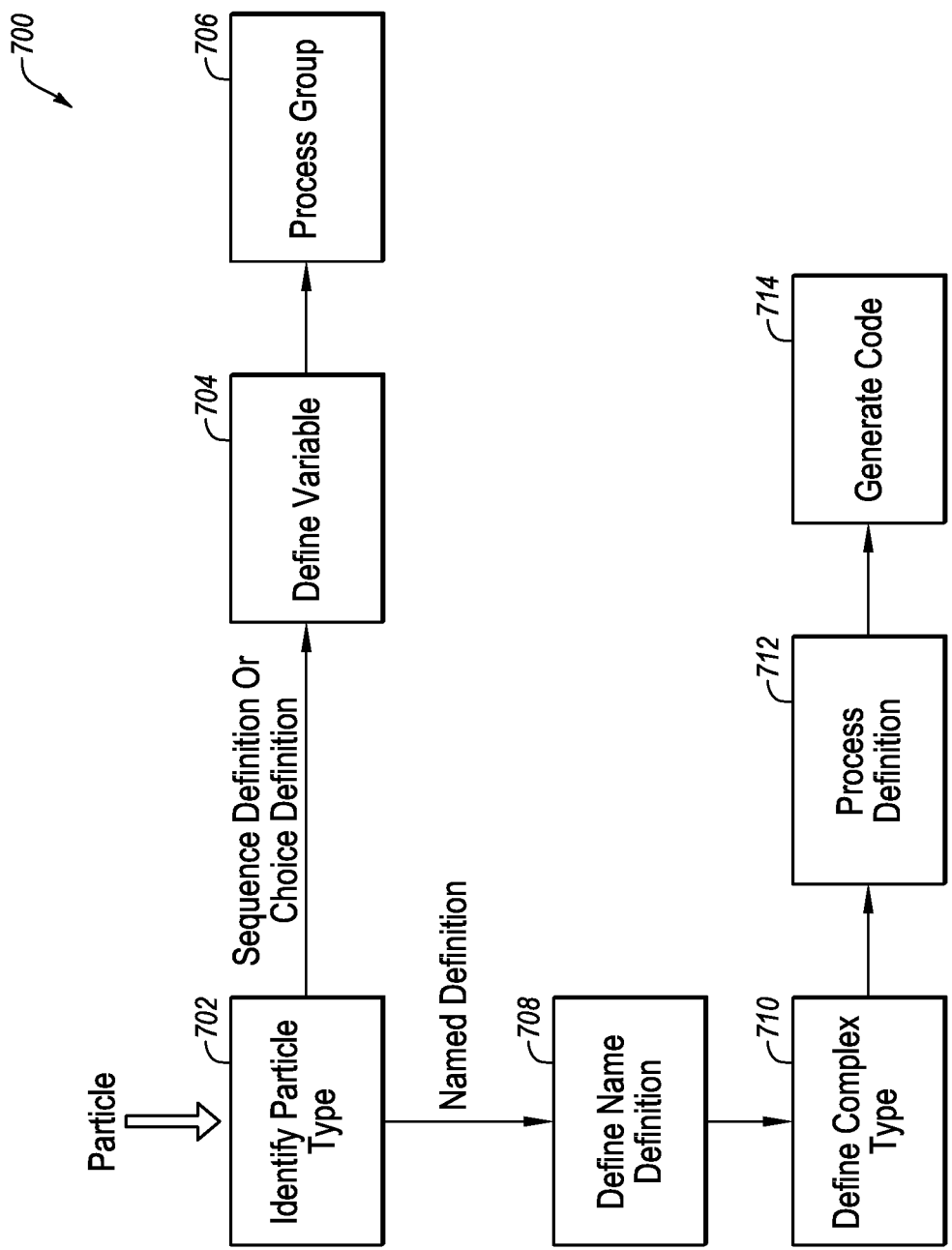
FIG. 7A is a block diagram of an example method of processing a particle of a description schema.

Modifications, additions, or omissions may be made to method 600 without departing from the scope of the present disclosure. For example, the operations of method 600 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment FIG. 7A shows an example flow diagram of a method 700 of processing a JSON data particle, arranged in accordance with at least one embodiment described herein. In some examples, method 700 may be performed for each particle of JSON data. Although illustrated as discrete blocks, various blocks may be divided into additional blocks, combined into fewer blocks, or eliminated, depending on the desired implementation.

In some embodiments, method 700 may be performed by a system such as validation system 900 of FIG. 9. For instance, processing device 920 of FIG. 9 may be configured to execute computer instructions stored on memory 930 to perform functions and operations as represented by one or more of the blocks of method 700.

Method 700 may begin at block 702. At block 702, a particle type of an object may be identified. For example, upon receipt of a particle as an input, a particle type may be identified as either a sequence definition, a choice definition, or a named definition. If the particle type is either a sequence definition or a choice definition, method 700 may proceed to block 704. If the particle type is a named definition, method 700 may proceed to block 708. In some embodiments, a particle may include an occurrence condition, which may identify the particle as either an optional particle or a required particle.

At block 704, a variable, which defines whether or not the particle is optional may be set, and method 700 may proceed to block 706. For example, an "isOptional" variable may be set to "true" if the particle is optional, otherwise the "isOptional" variable may be set to "false."

At block 706, a group may processed. More specifically, in some embodiments, a function for processing a group may be called, and the function may receive a variable (e.g., "isOptional" variable) and a definition (e.g., a sequence definition or a choice definition) as an input. In some embodiments, a particle may be processed according to method 800 described below with reference to FIG. 8A.

At block 708, the named definition may be defined and method 700 may proceed to block 710. For example, XML code defining the named definition may be generated. As a more specific example, XML schema 750 defining the named definition is illustrated in FIG. 7B.

At block 710, XML code to define a complex type may be generated, and method 700 may proceed to block 712. For example, XML schema 752 to define the complex type is illustrated in FIG. 7C.

At block 712, a definition of the named definition may be processed, and method may proceed to block 714. For example, a "process definition" function may be called, and the function may receive the inner definition (e.g., the definition of the named definition) as an input. In some embodiments, a definition may be processed according to method 600 described below with reference to FIG. 6A.

At block 714, XML code including one or more end tags may be generated. For example, XML schema 754 including a plurality of end tags is illustrated in FIG. 7D.

Modifications, additions, or omissions may be made to method 700 without departing from the scope of the present disclosure. For example, the operations of method 700 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

Figure 8A:
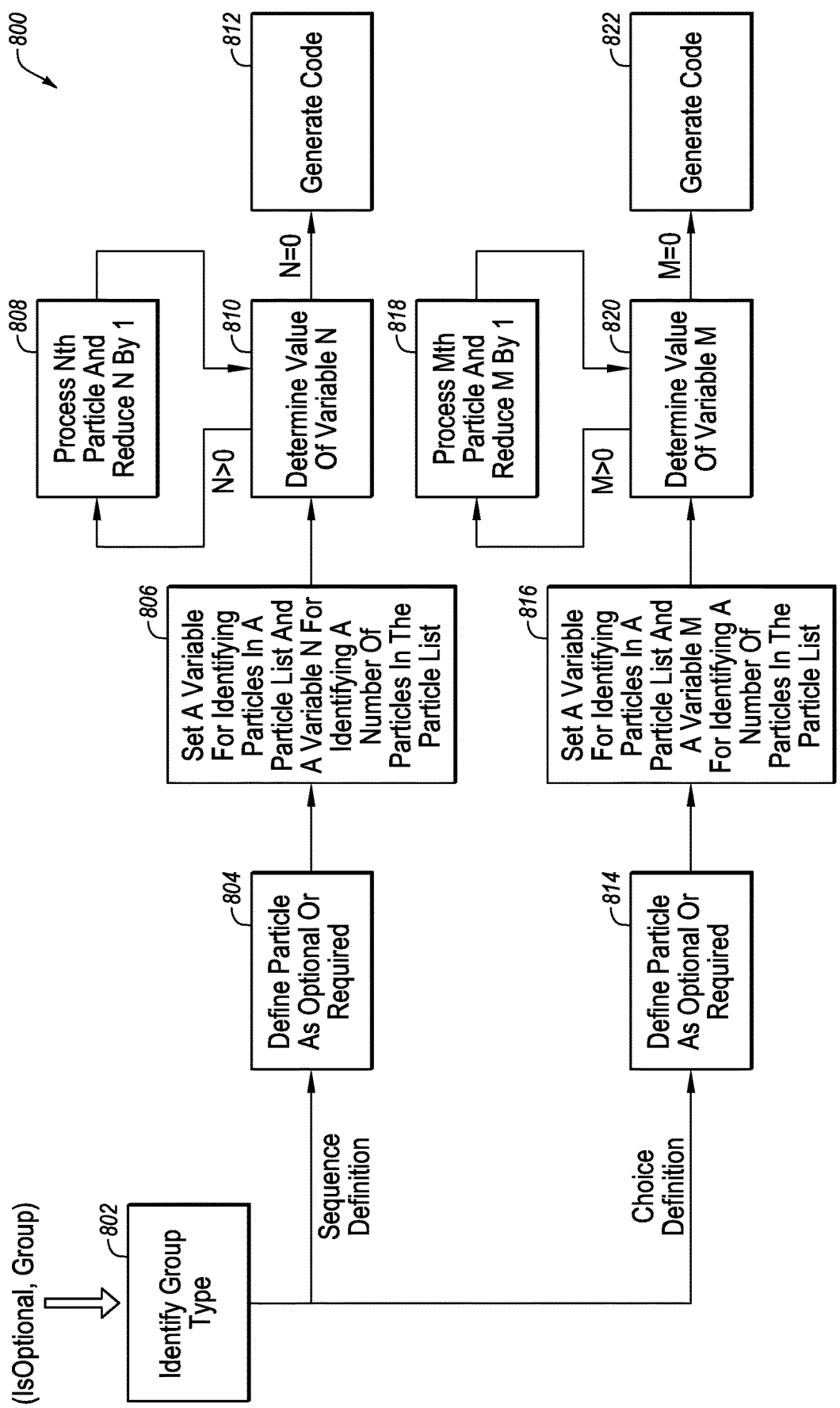
FIG. 8A is a block diagram of an example method of processing a group of a description schema.

FIG. 8A shows an example flow diagram of a method 800 of processing a JSON data group, arranged in accordance with at least one embodiment described herein. A "group" may include particles and may include a sequence or a choice. In some examples, method 800 may be performed for each group in the JSON data. Although illustrated as discrete blocks, various blocks may be divided into additional blocks, combined into fewer blocks, or eliminated, depending on the desired implementation.

In some embodiments, method 800 may be performed by a system such as validation system 900 of FIG. 9. For instance, processing device 920 of FIG. 9 may be configured to execute computer instructions stored on memory 930 to perform functions and operations as represented by one or more of the blocks of method 800.

Method 800 may begin at block 802. At block 802, a group type may be identified. For example, upon receipt of a group as an input, a group type may be identified as either a sequence definition or a choice definition. If the group type is a sequence definition, method 800 may proceed to block 804. If the group type is a choice definition, method 800 may proceed to block 814. In some embodiments, a Boolean variable (e.g., an "isOptional" variable) may also be received as an input, wherein the Boolean variable may define whether or not a particle is optional.

At block 804, a particle of the group for the sequence definition may be defined as optional or required, and method 800 may proceed to block 806. For example, XML code for defining whether or not a particle is optional may be generated. As a more specific example, XML schema 850 defining whether or not a particle is optional is illustrated in FIG. 8B.

At block 806, a variable for identifying particles in a particle list may be set, a variable identifying the number of particles in the list may be set, and method 800 may proceed to block 810. For example, a "ParticleList" variable may identify a list of particles in a sequence definition and a variable "N" may identify a number of particles in "ParticleList."

At block 810, a value of variable N may be determined. If the variable N is greater than 0, method 800 may proceed to block 808. If variable N is equal to 0, method 800 may proceed to block 812.

At block 808, an Nth particle of the particle list ("ParticleList") may be processed, the variable N may be reduced by 1, and method 800 may return to block 810. For example, the Nth particle may be process according to method 700 described below with reference to FIG. 7.

At block 812, XML code including one or more end tags may be generated. For example, XML schema 852 including an end tag is illustrated in FIG. 8C.

At block 814, a particle of the group for the choice definition may be defined as optional or required, and method 800 may proceed to block 816. For example, XML code for defining whether or not a particle is optional may be generated. As a more specific example, XML schema 854 defining whether or not a particle is optional is illustrated in FIG. 8D.

At block 816, a variable for identifying particles in a particle list may be set, a variable identifying the number of particles in the list may be set, and method 800 may proceed to block 820. For example, a "ParticleList" variable may identify a list of particles in a choice definition and a variable "M" may identify a number of particles in "ParticleList."

At block 820, a value of variable M may be determined. If the variable M is greater than zero, method 800 may proceed to block 818. If variable M is equal to zero, method 800 may proceed to block 822.

At block 818, an Mth particle of the particle list ("ParticleList") may be processed, the variable M may be reduced by 1, and method 800 may return to block 820. For example, the Mth particle may be process according to method 700 described below with reference to FIG. 7.

At block 822, XML code including one or more end tags may be generated. For example, XML schema 856 including an end tag is illustrated in FIG. 8E.

Modifications, additions, or omissions may be made to method 800 without departing from the scope of the present disclosure. For example, the operations of method 800 may be implemented in differing order. Furthermore, the outlined operations and actions are only provided as examples, and some of the operations and actions may be optional, combined into fewer operations and actions, or expanded into additional operations and actions without detracting from the essence of the disclosed embodiment.

FIG. 9 is a block diagram of the example validation system 900, arranged in accordance with at least one embodiment described herein. In some embodiments, validation system 900 may include a processor-based computing device. For example, validation system 900 may include a tablet computer, a laptop computer, a desktop computer, mainframe, or any other processor-based computing device. In some embodiments, validation system 900 may include a special-purpose processor-based computing device configured to execute one or more blocks of methods 500, 600, 700, 800 described above with reference to FIGS. 5A-8E when executed by processing device 920.

Validation system 900 may include a processor 910, a processing device 920, and a memory 930. The various components of validation system 900 may be communicatively coupled to one another via a bus 940.

Processing device 920 may include an arithmetic logic unit, a microprocessor, a general-purpose controller, or some other processor array to perform computations and provide electronic display signals to a display device. Processing device 920 processes data signals and may include various computing architectures including a complex instruction set computer (CISC) architecture, a reduced instruction set computer (RISC) architecture, or an architecture implementing a combination of instruction sets. Although FIG. 9 includes a single processing device 920, multiple processing devices 920 may be included. Other processors, operating systems, sensors, displays, and physical configurations are possible.

In one embodiment, validation system 900 may include code and routines configured to perform or control performance of one or more blocks of methods 500, 600, 700, 800 described above with reference to FIGS. 5A-8E when executed by the processing device 920.

Memory 930 may store instructions and/or data that may be executed by processing device 920. The instructions and/or data may include code for performing the techniques described herein. In some embodiments, the instructions may include instructions and data which cause processing device 920 to perform a certain function or group of functions.

In some embodiments, memory 930 may include a computer-readable media for carrying or having computer-executable instructions or data structures stored thereon. Such computer-readable media may be any available media that may be accessed by processing device 920 that may be programmed to execute the computer-executable instructions stored on the computer-readable media. By way of example, and not limitation, such computer-readable media may include non-transitory computer-readable storage media including Random Access Memory (RAM), Read-Only Memory (ROM), Electrically Erasable Programmable Read-Only Memory (EEPROM), Compact Disc Read-Only Memory (CD-ROM) or other optical disk storage, magnetic disk storage or other magnetic storage devices, flash memory devices (e.g., solid state memory devices), or any other non-transitory storage medium which may be used to carry or store desired program code in the form of computer-executable instructions or data structures and which may be accessed by the processing device 920. Memory 930 may be a tangible or non-transitory computer-readable medium storing executable instructions which may be accessed and executed by processing device 920. Combinations of the above may also be included within the scope of computer-readable media. Memory 930 may store, for example, JSchemas, XML Schemas, XML data, JSON data, validation results, JSOMs, or any other data disclosed herein (e.g. any data related to validation of JSON data).

Optionally, in some embodiments, memory 930 may store any other data to provide its functionality. For example, memory 930 may store one or more libraries of standard functions or custom functions. In some embodiments, processor 910 may include code and routines stored on memory 930 and executed by the processing device 920.

As used herein, the terms "module" or "component" may refer to specific hardware implementations configured to perform the operations of the module or component and/or software objects or software routines that may be stored on and/or executed by validation system 900. In some embodiments, the different components and modules described herein may be implemented as objects or processes that execute on a computing system (e.g., as separate threads). While some of the system and methods described herein are generally described as being implemented in software (stored on and/or executed by validation system 900), specific hardware implementations or a combination of software and specific hardware implementations are also possible and contemplated. In this description, a "computing entity" may include any computing system as defined herein, or any module or combination of modules running on a computing system such as system 900.

As used in the present disclosure, the terms "module" or "component" may refer to specific hardware implementations configured to perform the actions of the module or component and/or software objects or software routines that may be stored on and/or executed by general purpose hardware (e.g., computer-readable media, processing devices, etc.) of the computing system. In some embodiments, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated. In the present disclosure, a "computing entity" may be any computing system as previously defined in the present disclosure, or any module or combination of modulates running on a computing system.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

All examples and conditional language recited in the present disclosure are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, various changes, substitutions, and alterations could be made hereto without departing from the spirit and scope of the present disclosure.

What is claimed is:

1. A JavaScript Object Notation (JSON) data validation method, comprising:
   generating a description schema that describes valid JSON data using one or more JSON constructs, the description schema including a definition, wherein the definition includes an object definition, a string definition, or a number definition;
   identifying the definition as an object definition;
   obtaining a content model of the object definition;
   processing a particle of the object definition based on the content model, wherein the particle includes a sequence definition, a choice definition, or a named definition;
   converting the description schema to an Extensible Markup Language (XML) schema based on the processed particle;
   obtaining candidate JSON data for validation;
   converting the candidate JSON data to XML data; and
   validating the candidate JSON data based on the XML data conforming to the XML schema.

2. The method of claim 1, wherein the converting the description schema to an XML schema comprises loading the description schema into a JavaScript Object Model (JSOM).

3. The method of claim 2, wherein the converting the description schema to an XML schema further comprises converting the JSOM to the XML schema.

4. The method of claim 2, wherein the loading the description schema into a JSOM comprises loading the description schema into the JSOM including at least one of an object definition, a sequence definition, and a number definition.

5. The method of claim 1, wherein the validating the candidate JSON data comprises determining whether the candidate JSON data is valid or invalid.

6. The method of claim 1, wherein the validating the candidate JSON data comprises validating one or more JSON files.

7. The method of claim 1, wherein the generating the description schema comprises generating the description schema for defining at least one of one or more data structures and one or more datatypes of the valid JSON data.

8. A system, comprising:
   one or more processors configured to:
   generate a description schema that describes valid JavaScript Object Notation (JSON) data using one or more JSON constructs, the description schema including a definition, wherein the definition includes an object definition, a string definition, or a number definition;
   identify the definition as an object definition;
   obtain a content model of the object definition;
   process a particle of the object definition based on the content model, wherein the particle includes a sequence definition, a choice definition, or a named definition;
   convert the description schema to an Extensible Markup Language (XML) schema based on the processed particle;
   obtain candidate JSON data for validation;
   convert the candidate JSON data to XML data; and
   validate the candidate JSON data based on the XML data conforming to the XML schema.

9. The system of claim 8, wherein the one or more processors are further configured to load the description schema into a JavaScript Object Model (JSOM).

10. The system of claim 9, wherein the one or more processors are further configured to convert the JSOM to the XML schema.

11. The system of claim 9, wherein the JSOM comprises at least one of an object definition, a sequence definition, and a number definition.

12. The system of claim 8, wherein the one or more processors are configured to validate the candidate JSON data to determine whether the JSON data is valid or invalid.

13. The system of claim 8, wherein the candidate JSON data comprises one or more JSON files.

14. The system of claim 8, wherein the description schema defines at least one of one or more data structures and one or more datatypes of the valid JSON data.

15. A non-transitory computer-readable medium having computer instructions stored thereon that are executable by a processing device to perform or control performance of operations comprising:
   generating a description schema that describes valid JavaScript Object Notation (JSON) data using one or more JSON constructs, the description schema including a definition, wherein the definition includes an object definition, a string definition, or a number definition;
   identifying the definition as an object definition;
   obtaining a content model of the object definition;
   processing a particle of the object definition based on the content model, wherein the particle includes a sequence definition, a choice definition, or a named definition;
   converting the description schema to an Extensible Markup Language (XML) schema based on the processed particle;
   obtaining candidate JSON data for validation;
   converting the candidate JSON data to XML data; and
   validating the candidate JSON data based on the XML Schema and the XML data conforming to the XML schema.

16. The non-transitory computer-readable medium of claim 15, the operations further comprising loading the description schema into a JavaScript Object Model (JSOM).

17. The non-transitory computer-readable medium of claim 16, wherein converting the description schema to an XML schema comprises converting the JSOM to the XML schema.

18. The non-transitory computer-readable medium of claim 15, wherein validating the candidate JSON data comprises validating one or more JSON files.

19. The non-transitory computer-readable medium of claim 15, wherein validating the candidate JSON data comprises determining whether the candidate JSON data is valid or invalid.

20. The non-transitory computer-readable medium of claim 15, wherein generating the description schema comprises generating the description schema for defining at least one of one or more data structures and one or more datatypes of the valid JSON data.

\* \* \* \* \*